United States Patent [19]
Mohammed

[11] Patent Number: 5,683,293
[45] Date of Patent: Nov. 4, 1997

[54] COMBINED VENT AND GLARE SCREEN UNIT FOR VEHICLE WINDOWS

[76] Inventor: Gaffar Mohammed, 3080 Peace Court, Windsor, Ontario, Canada, N8T 2J4

[21] Appl. No.: 711,273

[22] Filed: Sep. 10, 1996

[51] Int. Cl.$^6$ .................... B60H 1/30; B60J 1/20
[52] U.S. Cl. ............... 454/132; 296/97.9; 296/97.11; 454/133
[58] Field of Search .................... 454/128, 131, 454/132, 133, 135; 296/97.9, 97.11

[56] References Cited

U.S. PATENT DOCUMENTS

| | | |
|---|---|---|
| 1,457,959 | 6/1923 | Braucher ........................ 454/133 |
| 1,518,715 | 12/1924 | Walker ........................... 454/132 |
| 1,628,053 | 5/1927 | McTighe ......................... 454/132 |
| 1,728,777 | 9/1929 | Trier ............................... 454/132 |
| 1,787,637 | 1/1931 | McNab . |
| 1,825,192 | 9/1931 | Mace . |
| 2,322,590 | 6/1943 | Pickering et al. . |
| 2,557,442 | 6/1951 | Kurilo . |
| 2,628,549 | 2/1953 | Stelmach . |
| 2,751,839 | 6/1956 | Moore . |
| 2,755,728 | 7/1956 | Frisby . |
| 3,073,525 | 1/1963 | Cislo . |
| 3,083,630 | 4/1963 | Thaxton . |
| 3,389,505 | 6/1968 | Zitomer . |
| 3,434,408 | 3/1969 | Rivers et al. .................. 454/134 |
| 3,509,812 | 5/1970 | James . |
| 3,564,770 | 2/1971 | Korbelic . |
| 3,659,516 | 5/1972 | MacDonald . |
| 4,057,094 | 11/1977 | Smith . |
| 4,407,187 | 10/1983 | Horney . |
| 4,546,693 | 10/1985 | McTaw, Jr. .................... 454/128 |
| 4,864,920 | 9/1989 | Inagaki ............................ 454/132 |
| 4,893,550 | 1/1990 | Cheng . |
| 5,251,953 | 10/1993 | Willey . |

*Primary Examiner*—Harold Joyce
*Attorney, Agent, or Firm*—John R. Benefiel

[57] ABSTRACT

A ventilator-glare screen unit adapted to be fit in an automotive window opening, having controllably opened vent hole groupings and an inner glare screen able to be moved from a raised to a lowered position. A wedge-shaped extension piece attached to a forward edge is fit to an angled front window glass edge. A slidable control panel allows different vent hole groupings to be opened or blocked. A hood minimizes entry of rain, etc. into the opened vent holes.

15 Claims, 5 Drawing Sheets

COMBINED VENT AND GLARE SCREEN UNIT FOR VEHICLE WINDOWS

BACKGROUND OF THE INVENTION

This invention concerns window accessories for automotive vehicles. It is desirable to vent the interior of parked passenger compartments to prevent solar overheating and to provide fresh air. However, windows when left opened in parked cars allow access to the car and rain to enter the interior.

Airflow into the open windows when the auto is being driven can create unwanted noise and strong air drafts on the occupants.

There has heretofore been proposed various window vent attachments fit into a window frame of a motor vehicle.

For example, see U.S. Pat. No. 1,787,637 issued on Jan. 6, 1931 for an "Air Extractor"; U.S. Pat. No. 2,557,442 issued on Jun. 19, 1951 for a "Ventilator"; U.S. Pat. No. 3,434,408 issued on Mar. 25, 1969 for a "Vehicle Window Air Vent"; and, U.S. Pat. No. 3,659,516 issued on May 2, 1972 for a "Window Ventilator".

While these patents attempt to solve the problem of allowing controlled airflow in and out of the passenger compartment, mostly by one-way airflow system they do not provide any help with the need for providing a glare screen shielding the occupant from bright sun entering the side windows.

In addition, prior vent designs are not adapted to the shape of modern auto windows which often have a long slanted forward edge.

Also, the airflow control features are relatively primitive, and do not allow selective control over inflow or outflow of air into or from the passenger compartment, through the same window unit at a time, as most other have one-way airflow system per unit in the only one fixed setting, which is on all the time. There is no choice to turn the ventilation offs especially during the winter time, and also, there is no proper arrangement for the outflow of trapped air from inside and even though one of the prior patents has a two-way system, but it lacks simplicity and total efficiency.

The only outlet for the second hand smoke is through the rear pop-out window, which on its way out, exposes the rear passengers to smoke, which is a health hazard especially to children who are typically in the back seat.

Another drawback to previously proposed ventilator designs has been that there is no convenient way to direct cigar or cigarette smoke out of the passenger compartment when the ventilator is installed.

At present, many passenger cars and minivans have permanently fixed windows which do not allow ventilation. Such vehicles do not have pop-out windows, but these are inefficient in terms of cross ventilation in passenger cars and minivans, etc. This window style is also susceptible to corrosion around its window frame due to rain water and moisture retained around the rim of the window.

It is an object of the present invention to provide an attachment for automotive vehicle windows which includes both a controlled ventilation arrangement as well as a movable glare panel.

It is an object of the present invention to provide solutions to all of the above-described problems, and protect the upholstering and facilitate a cooler and smoke-free environment in the seat compartment. This independent control system will force the cigarette smoke out through the smoker's side window and, at the same time, provide cooler temperatures inside the vehicle. In addition, this unit has a movable glare screen panel, which protects the occupants from sun glare through the side window.

It is another object of the present invention to provide a modern window ventilator unit which enables a control over the inflow or outflow of air, which includes an accommodation for forwardly angled window shapes, and which also allows direct outflow of cigarette smoke from the vicinity of the smoker without opening the automobile window or removal of the ventilator unit.

SUMMARY OF THE INVENTION

These and other objects of the present invention, which will be understood upon a reading of the following specification and claims, are achieved by a combination ventilator-glare screen unit capable of being installed in an automotive vehicle window frame either temporarily, in the case of an installation using a movable window glass, or more or less permanently, in the case of windows having fixed glazing.

The ventilator unit according to the present invention is uniquely designed to have three independent control settings in one unit: off, inflow, and outflow, so the driver and each passenger has independent control of airflow. Each person may set the airflow to their needs by simply sliding the movable control panel in each window for selective airflow.

This innovative device is crafted in different styles to suit different shapes of the windows, including the permanent or fixed windows of passenger vehicles and minivans.

The ventilator portion of the unit includes a housing piece formed with an outside panel having groups of holes arranged in rows arranged along the length of the panel, with alternating rows of holes for establishing inflow or outflow of air in the passenger compartment.

A movable control panel having rows of holes which are moved into registry with alternate rows of holes in the outside panel in order to establish inflow or outflow of air from the vehicle interior space. An integral shielding hood projects from the outside of the housing piece to prevent entry of rain, etc. into the ventilation holes.

A glare screen panel is movably mounted to the housing piece. In a first version, the panel is movable vertically in a track so as to be located in an operative extended position beneath the ventilator housing piece or behind the housing piece, in a stowed position.

In a second embodiment, the glare screen panel is hinged to the ventilator housing piece and is swung up and down in being moved from a stowed to extended positions.

The inflow and outflow holes in alternate rows in the ventilator panel are angled forwardly and rearwardly, respectively. Scoop features are outwardly projected from the outside panel facing in both towards and the opposite directions to accomplish the enhancement of inflow and outflow of air.

In one embodiment, an extension panel fit to the forwardly angled window geometry is shaped to fit into the space of such forward angled lowered window, which extension panel contains an opening allowing a smoker to conveniently direct exhaust smoke from a cigar or cigarette by holding the same adjacent the extension panel opening.

Another embodiment is configured to be permanently fixed into the glazing window, in which the window glass is cut down and the ventilator-glare screen unit more or less permanently installed in the window opening.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
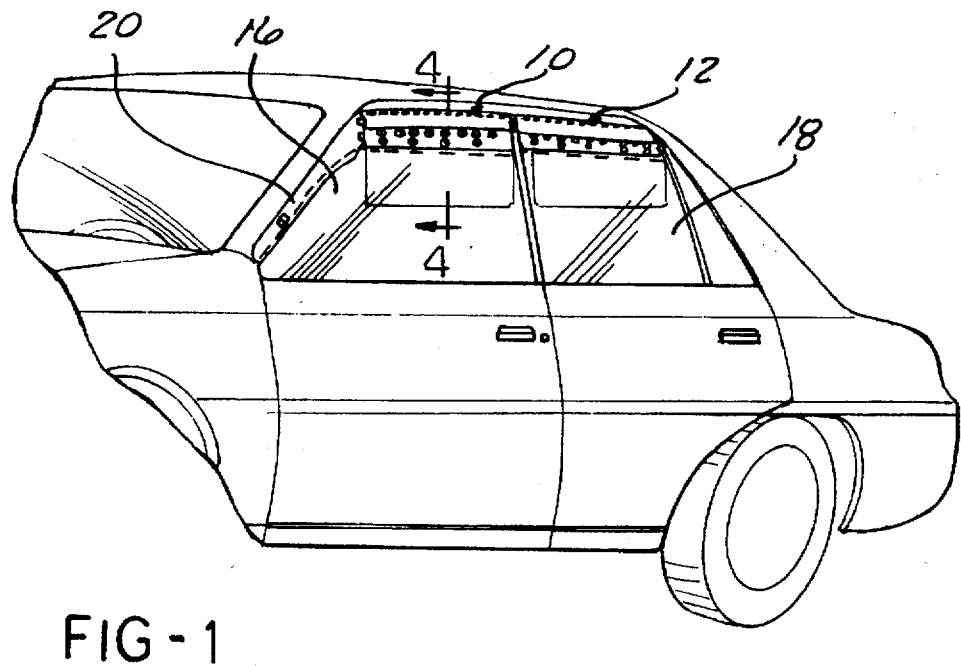
FIG. 1 is a perspective view of a sedan-model automobile having a front and rear window ventilator- glare screen unit installed.

FIG. 1 shows a pair of the ventilator-glare screen units 10 and 12 installed in the driver's side front frame window opening 16 and the rear left side window 18, respectively. The front ventilator unit 10 is identical to the rear window mounted ventilator unit 12 with the exception that an extension piece 20 is attached to the forward end of the ventilator unit 10 fit into the wedge-shaped gap between the front of the driver's side window 16 and the window frame, with the window in a partially lowered position as shown.

The ventilator unit 10 includes a ventilator housing piece 22 which is of generally rectangular shape. The piece 22 is preferably constructed of molded clear plastic and includes a lower U-shaped edge 24 adapted to receive the upper edge of the window glass when the housing piece 22 is positioned within the window frame.

The upper edge 26 is received in the frame groove normally receiving the upper edge 26 of the window glass with the window completely rolled up so that the housing piece 22 is held securely between the upper edge of the window within the window frame opening 16.

The housing piece 22 includes an integral shielding hood 28 extending lengthwise and projecting outwardly from the outside of the housing piece 22 at the upper region thereof.

The edge 26 projects above the hood 28 so as to enable the housing piece 22 to be fit within the window frame groove.

Figure 4:
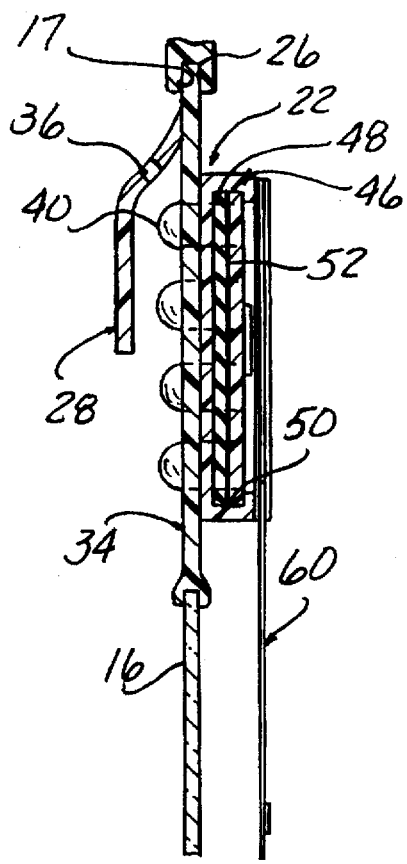
FIG. 4 is a sectional view taken through the window ventilator unit shown in FIG. 1.

A series of holes are arranged in alternate rows of four and two holes in vertical columns 30 and 32, respectively. The hole columns 30, 32 are formed in an outer panel portion 24 of the housing piece 22. The hood 28 curves downwardly and has a series of venting small holes 36 formed along the top of the hood 28. The inwardly projecting bottom wall of the hood 28 lies approximately midway between the top holes in each column 30 and 32 and the bottom exposed holes as shown in FIG. 4.

The holes in the first column 30 are angled forwardly in, while the two hole columns 32 are angled rearwardly for purposes as will be described hereinafter. In addition, there can optionally be provided raised scoops 40 and 42 aligned with and facing in correspondence with the inclination of the holes 30 and 32.

The columns of four holes 30 are for purpose of receiving inflow of air whereas the rearwardly angled holes in the two-hole columns 32 are for the purpose of allowing an outflow of air from the passenger compartment.

Precise control over the direction of airflow is provided by a movable control panel 44 which is horizontally slidable in a track structure 46 formed on the inside face of the housing piece 22 defining upper and lower grooves 48 and 50, guiding the horizontal movement of the control panel 46.

A gasket 52 of rubberized material may be interposed between the hole pattern on the outer panel 34 and the slidable control strip 44. The gasket has vertical columns of holes 54 and 56 which overlie the holes 30 and 32 in the outer panel 32.

The control strip 44, on the other hand, has vertical rows of four holes 58 adapted to be aligned with columns of the holes 30 or 32.

Figure 5A:
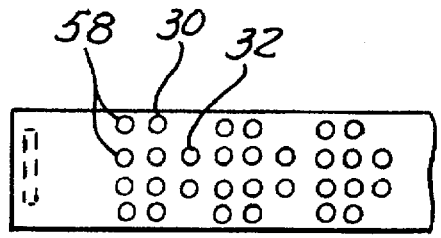
FIGS. 5A–5C are side elevational views of the respective control panel registries to accomplish control over the airflow to or from the passenger compartment.
Figure 5B:
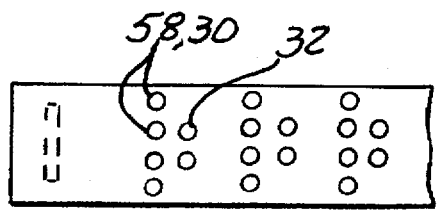
Figure 5C:
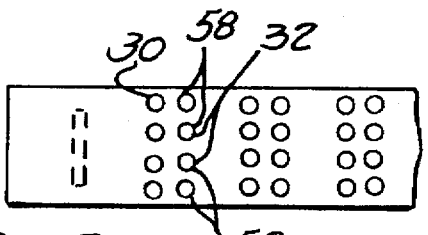

FIGS. 5A–5C show diagrammatically the three positions of the control strip 44. In FIG. 5A, the holes 58 are not aligned with either column holes 30 or 32, and air inflow and venting outflow are both completely blocked. In FIG. 5B, the holes 58 are aligned with the forwardly angled holes 30 and accordingly inlet airflow is allowed into the passenger compartment. In a third position shown in FIG. 5C, the control strip holes 58 are aligned with the two holes in the rearwardly angled holes in column 32, to allow outflow from the passenger compartment, whereas the inflow holes 30 are blocked.

Figure 2:
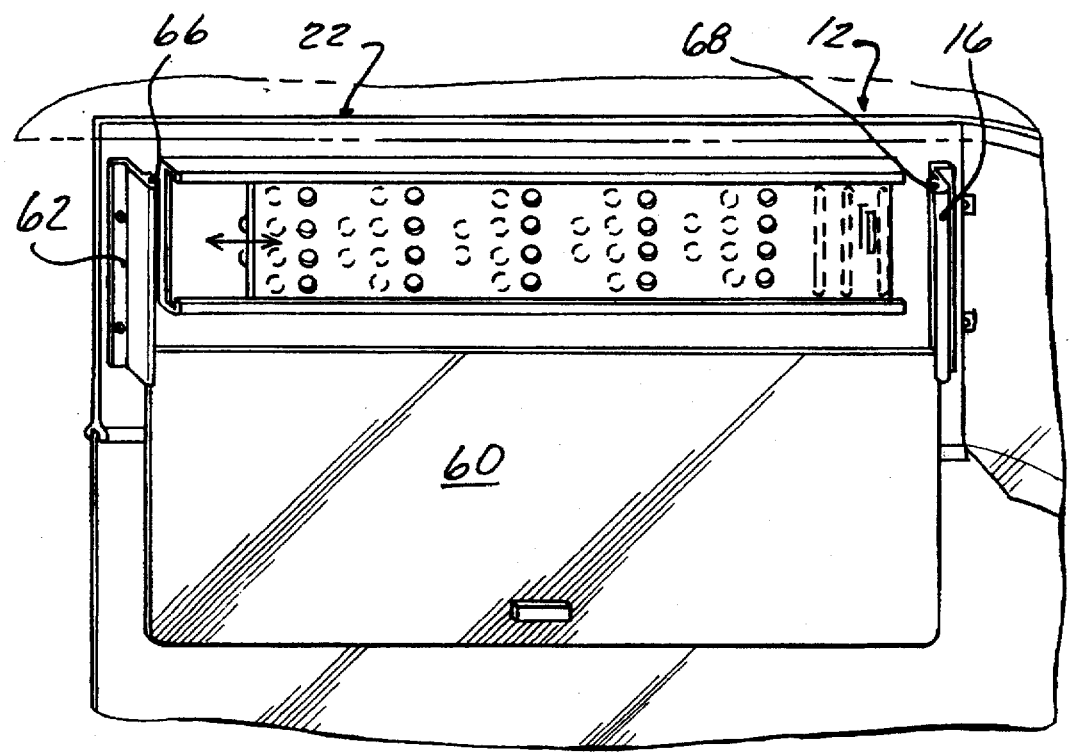
FIG. 2 is a perspective view from the inside of the rear window ventilator-glare screen unit shown in FIG. 1.
Figure 3:
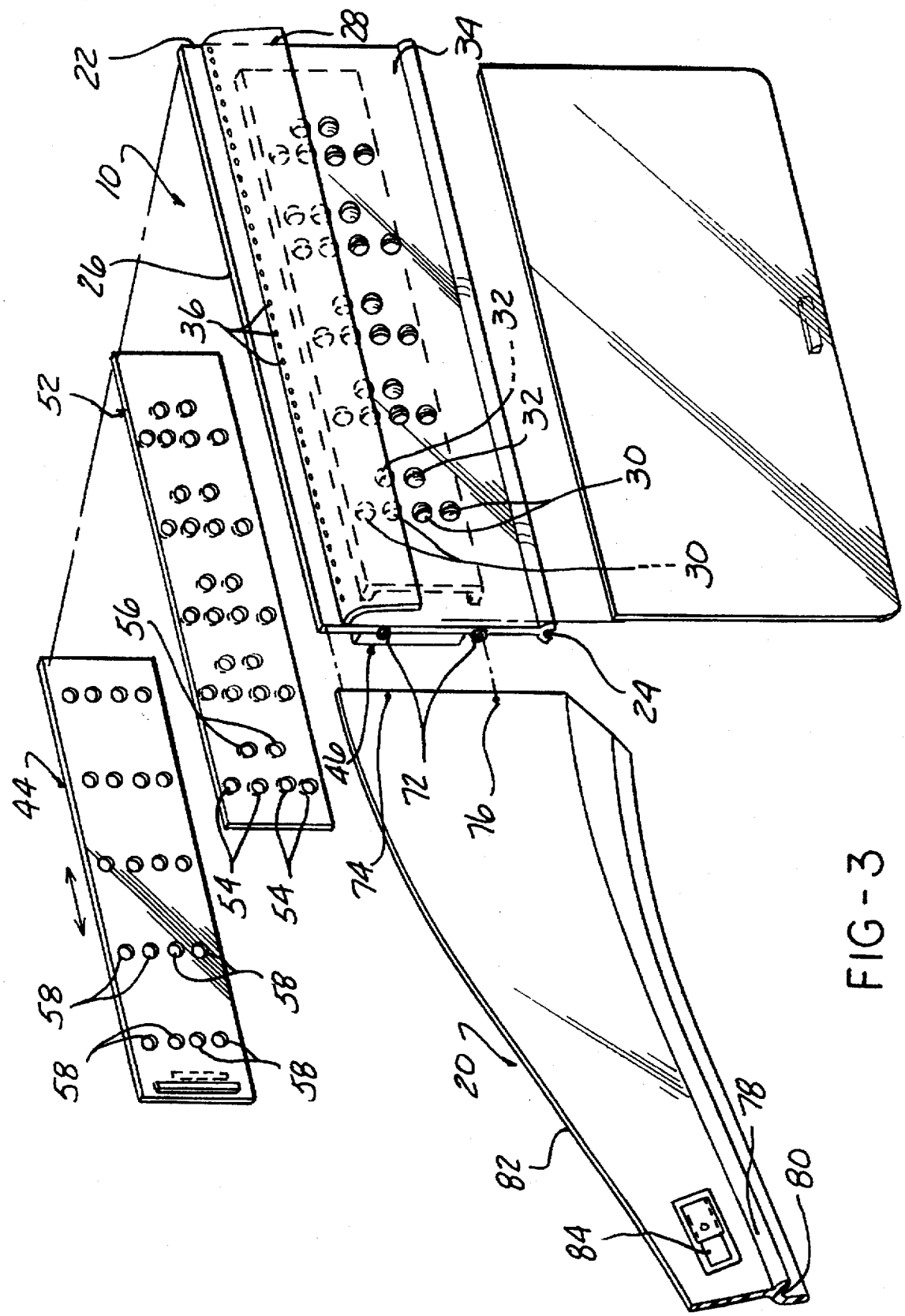
FIG. 3 is an exploded perspective view of the window ventilator-glare screen unit shown in FIG. 1 for the front window.

The ventilator-glare screen unit 10 also includes a movably mounted glare screen 60 which in the units 10 and 12 comprises a slidable track member 62 and 64 which are spaced apart and define vertical tracks 66 and 68 which capture the glare screen panel 60. The glare screen panel 60 can be raised to lie behind the housing piece 22, as well as the control strip 44 and track structure 46, but can be pulled down to a lowered position as shown in FIGS. 2 and 4.

Figure 6A:
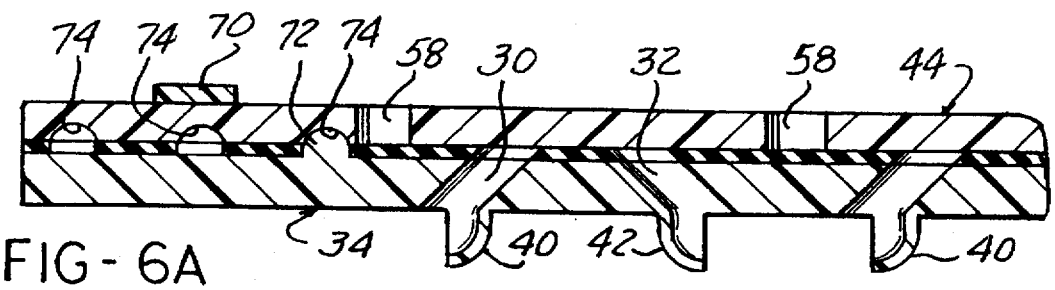
FIGS. 6A–6C are enlarged horizontal sectional view taken through the control and ventilator panels depicting the control panel and three separate positions.
Figure 6B:
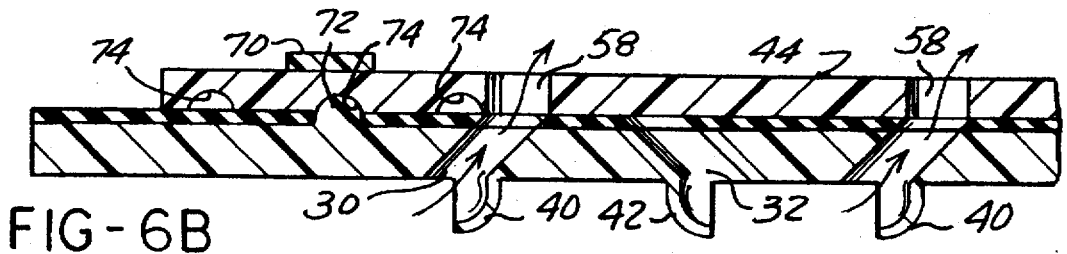
Figure 6C:
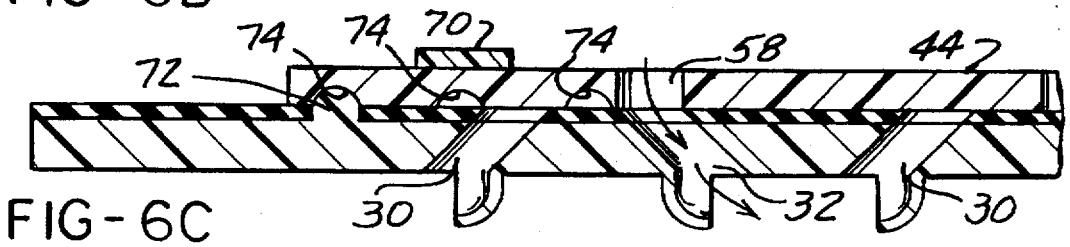

FIGS. 6A–6C also show the shifted adjusted positions of the control strip 44. A projecting bar 70 may be attached to the inside of the control strip 44. Also, a ridge 72 may be provided which moves successively into detent slots 74 in each adjusted position located so as to properly align the holes 58 in the control strip 44 with the holes 30 or 32 in the panel 34.

The front ventilation unit 12 also includes an extension piece 20 which may be attached by means of tabs 72 and threaded fasteners received in holes 74 in a rear edge spaced along an extension panel 20.

Extension panel 20 also has a bottom lip edge 78 defining a U-shaped surface 80 extending along the bottom edge adapted to receive the edge of the window glazing 16, whereas the upper edge 82 is fit within the window frame groove in the manner similar to the edge 26 of the housing piece 22.

An openable small window 84 is provided which enables the smoker to directly exhaust cigarette smoke when opened by holding the cigarette (or cigar) in the vicinity of the window. The shield 28 deflects rain from entering the holes 30 or 32.

Figure 9:
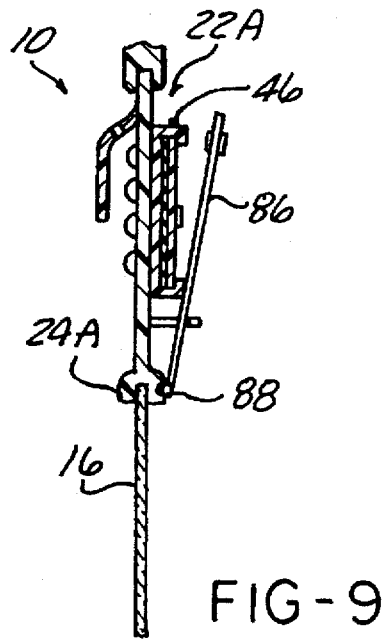
FIGS. 9 and 10 are side elevational sectional views taken through the ventilator-glare screen unit according to another embodiment of the invention showing the glare screen panel in the stowed and extended positions, respectively, with the glare screen panel being hinged to swing between the stowed and extended positions.
Figure 10:
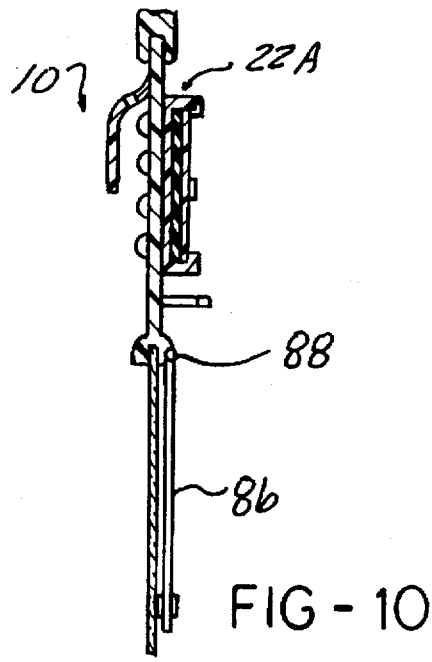

As shown in FIGS. 9 and 10, a pivoted glare screen 86 may also be employed which is pivoted at 88 to the edge 24A of the housing piece 22A as an alternative to the sliding mount described or shown in FIGS. 2 and 4.

Figure 11:
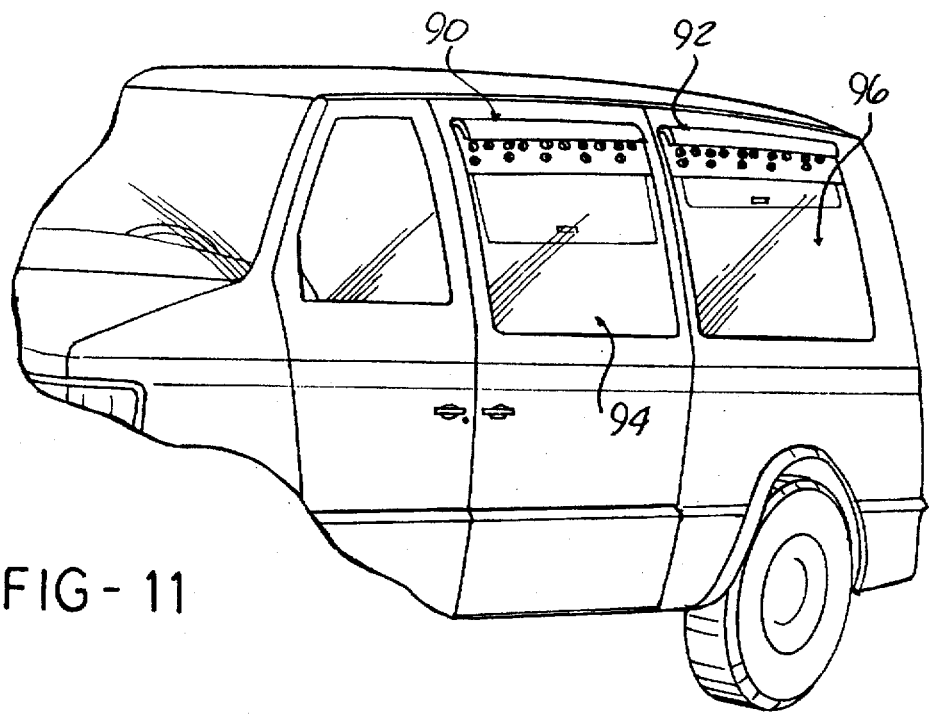
FIG. 11 is a perspective view of two of the ventilator units installed in fixed glazing van windows.

The glare screen according to the present invention may also be used with fixed glass as shown in FIG. 11 in which the units 90 and 92 are installed by cutting down the fixed glazing panels 94 and 96 in a van and more or less permanently installing the units into the open space.

Figure 7:
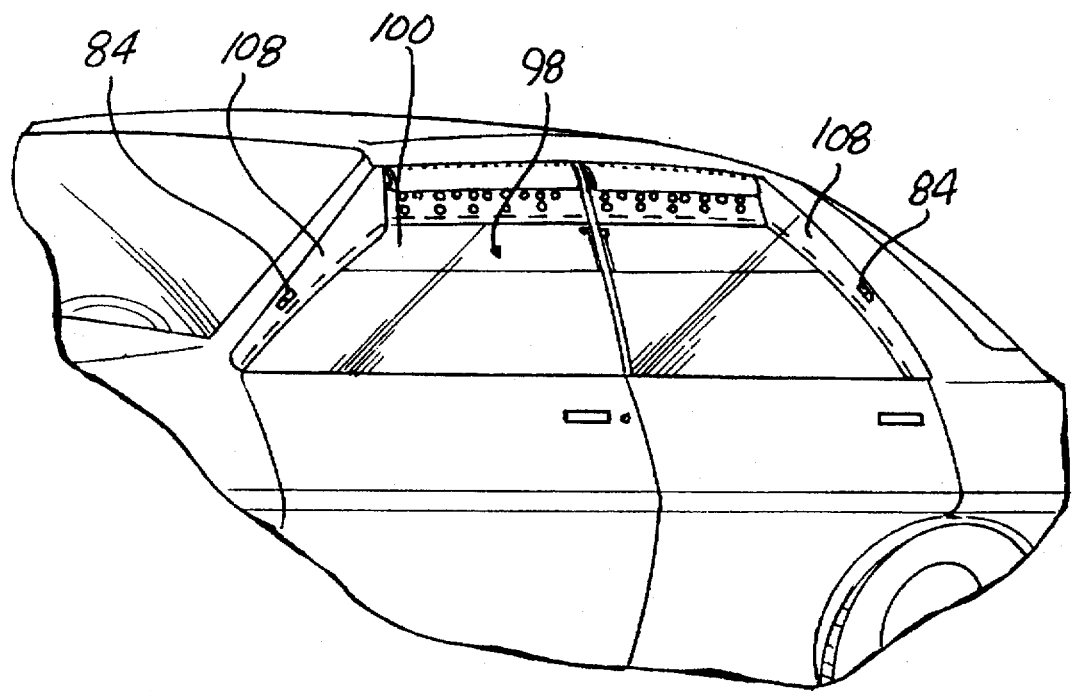
FIG. 7 is a perspective view of a vehicle having a pair of units according to another embodiment of the ventilator-glare screen unit according to the invention installed.
Figure 8:
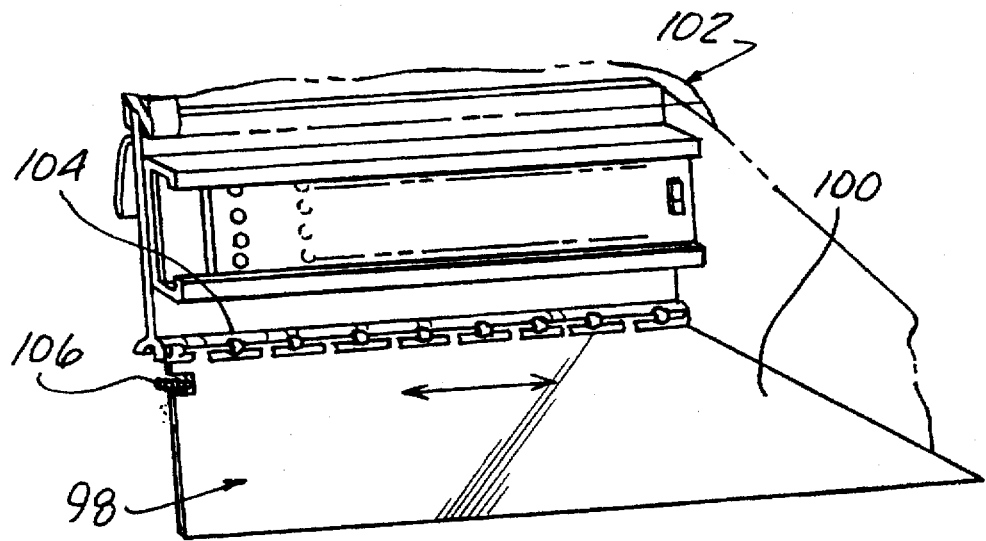
FIG. 8 is an enlarged perspective view of the vent glare screen unit shown in FIG. 7.

Another form of the glare screen is shown in FIGS. 7 and 8 in which the glare screen panel 98 is formed with an angularly projecting forward portion 100 which is adapted to stand forwardly from the main ventilator unit 102 as shown. In this instance, a hinged connection 104 allows a certain amount of axial travel. A spring 106 is provided to urge the panels 98 forwardly against the extension piece 108. An openable window 84 is in each extension piece 108, as in the above-described embodiment.

I claim:

1. A combined vent and glare screen unit for window openings in automotive vehicles passenger compartments, comprising:
   a vent housing piece having a length able to be fit into a window frame opening and having a bottom edge formed with an inverted channel adapted to receive the upper edge of a glazing panel, and an upwardly projecting top edge adapted to be received in a window frame groove;
   a planar outer panel portion of said housing piece having a series of vent holes extending therethrough;
   a vent control panel slidably mounted on an inner side of said housing piece outer panel portion and having control openings able to be moved into successive alignment with respective different groupings of said vent holes to enable controlled venting through said respective different vent hole groupings;
   a glare screen mounted to said housing piece on said inner side of said outer panel portion to be movable from a raised position over said vent control panel to a lowered position extending below said housing piece lower edge.

2. The combined vent and glare screen unit according to claim 1 further including a hood extending along the length of said housing piece spaced immediately below said upwardly projecting top edge and extending outwardly from said outer panel portion to shield said vent holes.

3. The combined vent and glare screen unit according to claim 2 wherein said hood portion extends over some of said vent holes.

4. The combined vent and glare screen unit according to claim 3 wherein a series of small vent openings are formed through an upper region of said hood.

5. The combined vent and glare screen unit according to claim 1 further including a wedge-shaped extension panel attached to one side of said housing piece and configured to be fit against a forward angle top edge of said window.

6. The combined vent and glare screen unit according to claim 5 wherein said extension panel has a small door mounted therein allowing disposal of small items therethrough.

7. The combined vent and glare screen unit according to claim 1 wherein said glare screen is mounted to be vertically slidable to be moved between said raised position to said lowered position.

8. The combined vent and glare screen unit according to claim 1 wherein said glare screen is hinged mounted to be able to be swung between said raised and lowered positions.

9. The combined vent and glare screen unit according to claim 1 wherein said vent hole groupings comprise alternate vertical rows of holes in said outer panel portion, with alternate rows of holes aligned with said control panel holes in successive shifted positions thereof.

10. The combined vent and glare screen unit according to claim 9 wherein said vent holes in alternate rows are angled forwardly and rearwardly, respectively.

11. The combined vent and glare screen unit according to claim 10 wherein said alternate rows of vent holes have differing numbers of holes, wherein a larger number of holes are forwardly angled.

12. The combined vent and glare screen unit according to claim 8 wherein said hinge mounting allows limited forward movement, said glare screen has an angled forward portion and is spring urged in a forward direction on said hinge mounting.

13. The combined vent and glare screen unit according to claim 1 wherein a rubberized plastic gasket is interposed between said inner side of said main panel portion and said control panel, said gasket having hole groupings matched and aligned with said vent hole grouping on said panel portion.

14. The combined vent and glare screen unit according to claim 1 further including a protruding scoop on one side of each vent hole.

15. The combined vent and glare screen unit according to claim 14 wherein each scoop adjacent vent holes in respective groupings are oppositely facing.

* * * * *